United States Patent
Lin et al.

(10) Patent No.: US 9,772,718 B2
(45) Date of Patent: Sep. 26, 2017

(54) OPTICAL TOUCH DEVICE AND TOUCH DETECTING METHOD USING THE SAME

(71) Applicant: Wistron Corporation, New Taipei (TW)

(72) Inventors: Yen-Ting Lin, New Taipei (TW); Yu-Yen Chen, New Taipei (TW); Po-Liang Huang, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 14/706,973

(22) Filed: May 8, 2015

(65) Prior Publication Data

US 2016/0209985 A1 Jul. 21, 2016

(30) Foreign Application Priority Data

Jan. 20, 2015 (TW) .............................. 104101777 A

(51) Int. Cl.
*G02B 27/01* (2006.01)
*G06F 3/042* (2006.01)
*G09G 5/00* (2006.01)

(52) U.S. Cl.
CPC ........... *G06F 3/0421* (2013.01); *G09G 5/003* (2013.01); *G09G 2300/04* (2013.01)

(58) Field of Classification Search
CPC .......... G06F 3/011; G06F 3/012; G06F 3/013; G06F 3/017; G06F 3/0304;
(Continued)

(56) References Cited

U.S. PATENT DOCUMENTS

| 2005/0156900 A1* | 7/2005 | Hill ....................... G06F 3/0428 345/173 |
| 2005/0178953 A1* | 8/2005 | Worthington ......... G06F 3/0421 250/221 |

(Continued)

FOREIGN PATENT DOCUMENTS

| CN | 102792249 | 11/2012 |
| TW | 201339921 | 10/2013 |

OTHER PUBLICATIONS

"Office Action of Taiwan Counterpart Application" with partial English translation, dated Jun. 4, 2016, p. 1-p. 13.
(Continued)

*Primary Examiner* — Lun-Yi Lao
*Assistant Examiner* — Jarurat Suteerawongsa
(74) *Attorney, Agent, or Firm* — Jianq Chyun IP Office

(57) ABSTRACT

An optical touch device and a touch detecting method using the same are provided. The optical touch device is suitable for use with a touch surface and includes a control unit and first to fourth optical capturing units. The first to fourth optical capturing units are disposed on a side of the optical touch device close to the touch surface. The first to fourth optical capturing units are respectively disposed at predetermined distances from the touch surface and are disposed based on predetermined angles. A touch covering area of each of the first to fourth optical capturing units is obtained respectively based on the predetermined distance and the predetermined angle. The touch covering area is positively correlated to the predetermined distance. At least one touch point on the touch surface is calculated by the control unit based on optical sensing information captured by the first to fourth optical capturing units.

7 Claims, 4 Drawing Sheets

(58) Field of Classification Search
CPC .. G06F 2200/1637; G06F 3/014; G06F 3/015; G06F 3/0421; G02B 27/0093; G02B 27/01; G02B 27/0101; G02B 2027/0138; G02B 2027/0134; G02B 2027/0143; G09G 2300/04; G09G 5/003
See application file for complete search history.

(56) References Cited

U.S. PATENT DOCUMENTS

| | | | |
|---|---|---|---|
| 2006/0139314 A1* | 6/2006 | Bell | A63F 13/02 345/156 |
| 2006/0232792 A1* | 10/2006 | Kobayashi | G06F 3/0421 356/621 |
| 2009/0146972 A1* | 6/2009 | Morrison | G06F 3/0418 345/175 |
| 2009/0277694 A1* | 11/2009 | Hansen | G06F 3/0421 178/18.03 |
| 2011/0187678 A1 | 8/2011 | Salaverry et al. | |
| 2013/0241882 A1 | 9/2013 | Leung et al. | |

OTHER PUBLICATIONS

"Office Action of Taiwan Counterpart Application" with partial English translation, dated Sep. 8, 2016, p. 1-p. 15.

* cited by examiner

OPTICAL TOUCH DEVICE AND TOUCH DETECTING METHOD USING THE SAME

CROSS-REFERENCE TO RELATED APPLICATION

This application claims the priority benefit of Taiwan application serial no. 104101777, filed on Jan. 20, 2015. The entirety of the above-mentioned patent application is hereby incorporated by reference herein and made a part of this specification.

BACKGROUND OF THE INVENTION

Field of the Invention

The invention relates to the touch sensing technology of an electronic apparatus and particularly relates to an optical touch device and a touch detecting method thereof.

Description of Related Art

Because of the convenient and highly-intuitive operation, touch electronic products are popular among the consumers and gradually become the main trend of the market in recent years. Among various touch sensing techniques for electronic products, the capacitive touch screen has the best touch performance but it is also the most expensive. Besides, the production costs of the capacitive touch screen increase with the screen size, thus limiting the applicability of the capacitive touch screen. Optical touch technology is suitable for large-sized display panels and has advantages, such as low cost and good accuracy, etc., which make it more competitive in the market. Thus, the optical touch technology has become another option for large-sized touch screens.

At present, the structure and size of the optical touch module need to be adjusted in proportion to the size of the touch panel. Thus, it is necessary to design the module according to the different ratios and sizes of the touch products so as to meet the spatial requirements. As a consequence, the fabricating processes, production tools, and wire materials kept in the factories also need to be adjusted and managed, which increases the costs and lowers the efficiency of utilization of the resources.

Therefore, how to develop a touch module compatible with touch panels of different sizes and different ratios for use in various touch products and at the same time reduce the production costs and improve utilization of the resources is an issue that needs to be addressed.

SUMMARY OF THE INVENTION

The invention provides an optical touch device and a touch detecting method thereof. The optical touch device is suitable for touch surfaces having different sizes and different ratios to meet the requirements of various touch products.

The invention provides an optical touch device. The optical touch device is suitable for use with a touch surface and includes a control unit and first to fourth optical capturing units. The first to fourth optical capturing units are coupled to the control unit and disposed on a side of the optical touch device close to the touch surface to obtain at least one piece of optical sensing information, wherein the first and second optical capturing units are disposed in a first region and the third and fourth optical capturing units are disposed in a second region. The touch surface is divided into a first sub-touch area, a second sub-touch area, and a third sub-touch area according to positions of the first region and the second region, wherein the first and third optical capturing units face the first sub-touch area, the second and third optical capturing regions face the second sub-touch area, and the second and fourth optical capturing units face the third sub-touch area. The control unit calculates at least one touch point in the touch surface based on a plurality of pieces of optical sensing information captured by the first to fourth optical capturing units. Each of the first to fourth optical capturing units is respectively disposed at a predetermined distance from the touch surface and arranged at a predetermined angle. A touch covering area of each of the first to fourth optical capturing units is obtained based on the predetermined distance and the predetermined angle, and the touch covering area is positively correlated to the predetermined distance.

In an embodiment of the invention, the touch covering area is calculated based on the predetermined distance, a field of view of each of the first to fourth optical capturing units, and the predetermined angle.

In an embodiment of the invention, the touch covering area is calculated based on the following equation:

$$w = h_a \cdot \left[\tan\left(\frac{FOV}{2} - \theta_a\right) + \tan\left(\frac{FOV}{2} + \theta_a\right)\right]$$

$h_a$ is the predetermined distance, $\theta_a$ is the predetermined angle, FOV is the field of view, and w is the touch covering area.

In an embodiment of the invention, the field of view of the touch covering area is greater than or equal to 90 degrees.

In an embodiment of the invention, the touch covering area is at least greater than a size of the touch surface.

In an embodiment of the invention, the optical touch device further includes at least four light source modules and an optical touch apparatus. The at least four light source modules are respectively disposed on the first to fourth optical capturing units to generate a light beam. The optical touch apparatus receives the light beam and totally reflects the light beam along a traveling path of the light beam.

In an embodiment of the invention, the optical touch device further includes an optical signal generating apparatus generating a light beam for at least two of the first to fourth optical capturing units to capture the optical sensing information.

In an embodiment of the invention, the optical touch device further includes a power supply. The power supply is coupled to the optical touch device to provide power to the optical touch device.

The invention provides a touch detecting method and an optical touch device using this method. The method includes the following steps. A plurality of pieces of optical sensing information of first to fourth optical capturing units are captured, wherein the first to fourth optical capturing units are coupled to the control unit and disposed on a side of the optical touch device close to a touch surface to obtain at least one piece of the optical sensing information. The first and second optical capturing units are disposed in a first region and the third and fourth optical capturing units are disposed in a second region, and the touch surface is divided into a first sub-touch area, a second sub-touch area, and a third sub-touch area according to positions of the first region and the second region. The first and third optical capturing units face the first sub-touch area, the second and third optical capturing regions face the second sub-touch area, and the second and fourth optical capturing units face the third sub-touch area. Each of the first to fourth optical capturing units is respectively disposed at a predetermined distance from the touch surface and arranged at a predetermined angle. A touch covering area of each of the first to fourth optical capturing units is obtained based on the predetermined distance and the predetermined angle, and the touch covering area is positively correlated to the predetermined distance. A touch point in the touch surface is calculated based on the optical sensing information.

In an embodiment of the invention, the touch covering area is calculated based on the predetermined distance, a field of view of each of the first to fourth optical capturing units, and the predetermined angle.

In an embodiment of the invention, the touch covering area is calculated based on the following equation:

$$w = h_a \cdot \left[ \tan\left(\frac{FOV}{2} - \theta_a\right) + \tan\left(\frac{FOV}{2} + \theta_a\right) \right]$$

wherein $h_a$ is the predetermined distance, $\theta_a$ is the predetermined angle, FOV is the field of view, and w is the touch covering area.

Based on the above, the optical touch device and the touch detecting method thereof disclosed in the embodiments of the invention dispose the four optical capturing units in different directions and at predetermined angles, such that the optical touch device is able to obtain the optical sensing information of each sub-touch area through two of the optical capturing units and thereby obtains the touch point. Thus, the touch surface covering a wider area is achieved without adjusting the structure of the optical touch device. Hence, the optical touch device of the invention is suitable for touch surfaces of different sizes and different ratios to meet the requirements of various touch products.

To make the aforementioned and other features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

Figure 1:
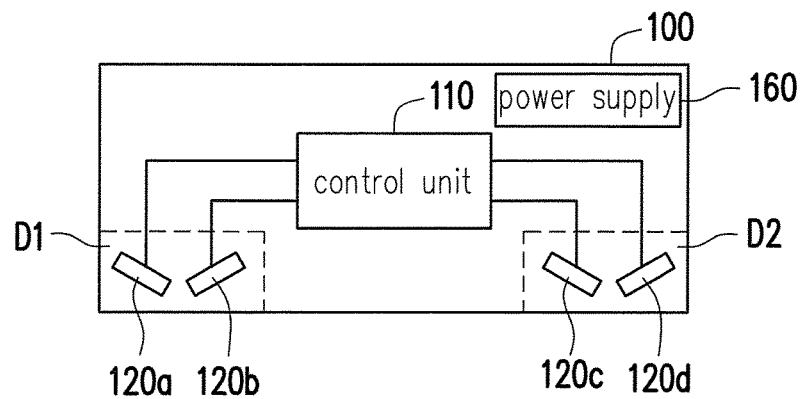
FIG. 1 is an architecture diagram showing an optical touch device according to an embodiment of the invention.

When observing an optical touch device and a touch detecting method thereof, it is noticed that the size of the touch panel has direct influence on the size of the whole device. The device needs to be designed corresponding to the different ratios and sizes of the touch products so as to meet the spatial requirements. Accordingly, in an embodiment of the invention, four optical capturing units inside the optical touch device are oriented in different directions at predetermined angles, such that the optical touch device is able to obtain optical sensing information of each sub-touch area through two of the optical capturing units and thereby obtains a touch point. Thus, a touch surface covering a wider area is achieved without adjusting the structure of the optical touch device.

Descriptions of the disclosure are given with reference to the exemplary embodiments illustrated by the accompanying drawings. In addition, wherever possible, identical or similar reference numerals stand for identical or similar elements/components in the drawings and embodiments.

Figure 2:
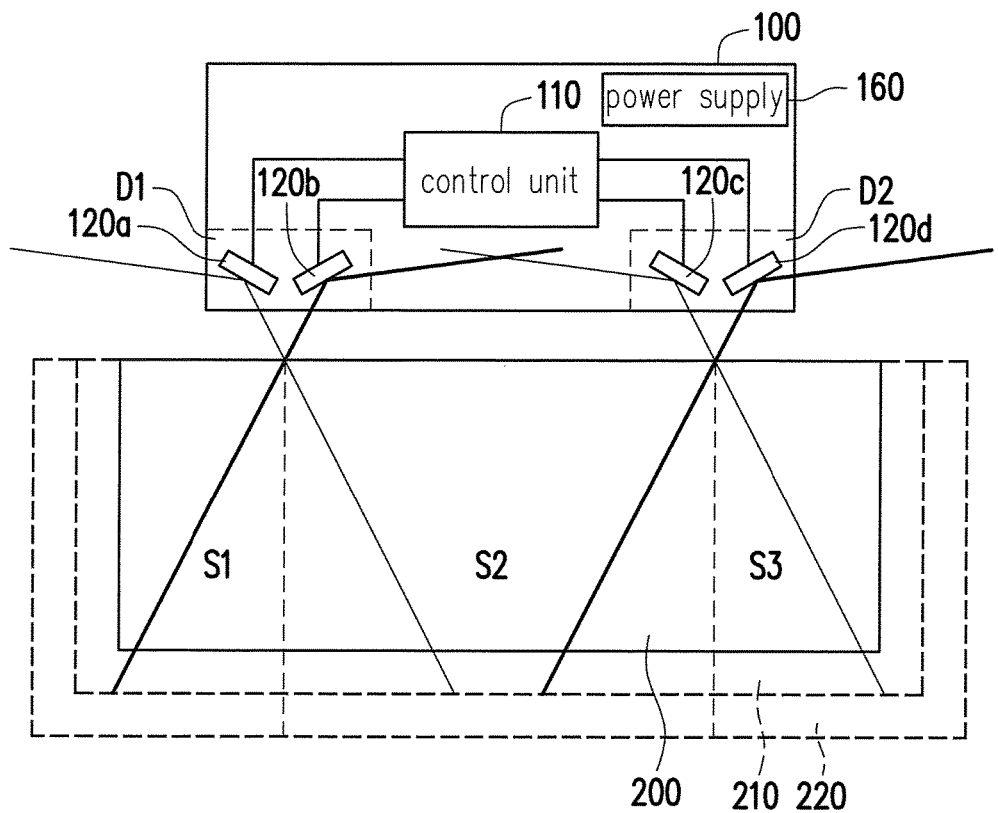
FIG. 2 is an architecture diagram showing an optical touch panel using the optical touch device of FIG. 1.

An exemplary embodiment of four optical capturing units is described below. Please refer to FIG. 1 and FIG. 2. FIG. 1 is an architecture diagram showing an optical touch device 100 according to an embodiment of the invention. FIG. 2 is an architecture diagram showing an optical touch panel 200 using the optical touch device 100 of FIG. 1. In this embodiment, the optical touch device 100 and the optical touch panel 200 are two different and independent devices. That is to say, the optical touch device 100 may be disposed on one electronic apparatus while the optical touch panel 200 is disposed on another electronic apparatus. The optical touch device 100 includes a control unit 110 and first to fourth optical capturing units 120a-120d.

The first to fourth optical capturing units 120a-120d are electrically connected to the control unit 110 and are disposed on a side of the optical touch device 100 close to the optical touch panel 200. The first optical capturing unit 120a and the second optical capturing unit 120b are disposed in a first region D1, and the third optical capturing unit 120c and the fourth optical capturing unit 120d are disposed in a second region D2. The optical touch panel 200 is divided into a first sub-touch area S1, a second sub-touch area S2, and a third sub-touch area S3 according to the positions of the first region D1 and the second region D2. The first optical capturing unit 120a and the third optical capturing unit 120c are oriented toward the first sub-touch area S1; the second optical capturing unit 120b and the third optical capturing unit 120c are oriented toward the second sub-touch area S2; and the second optical capturing unit 120b and the fourth optical capturing unit 120d are oriented toward the third sub-touch area S3. Then, the control unit 110 calculates at least one touch point in the optical touch panel 200 based on a plurality of pieces of optical sensing information captured by the first to fourth optical capturing units 120a-120d.

According to the conventional technology, usually the optical touch device includes only two optical capturing units. With reference to FIG. 2, for example, if the optical touch device 100 only includes the second optical capturing unit 120b and the third optical capturing unit 120c of the invention, the second optical capturing unit 120b and the third optical capturing unit 120c only cover the second sub-touch area S2. If the optical touch device 100 includes the first to fourth optical capturing units 120a-120d, the optical touch device 100 not only covers the second sub-touch area S2 but further covers the first sub-touch area S1 and the third sub-touch area S3. Thus, the whole touch covering area of the optical touch device 100 is increased.

Furthermore, the first to fourth optical capturing units 120a-120d are respectively disposed at predetermined distances from the optical touch panel 200 and arranged at predetermined angles, wherein a touch covering area of each of the first to fourth optical capturing units 120a-120d is obtained based on the predetermined distance and the predetermined angle, and the touch covering area is positively correlated to the predetermined distance. Hence, in addition to the increase of the touch covering areas of the first sub-touch area S1 and the third sub-touch area S3, the setting of the optical touch device is controlled to cover touch surfaces of different sizes without adjusting the structure of the optical touch device.

Figure 3:
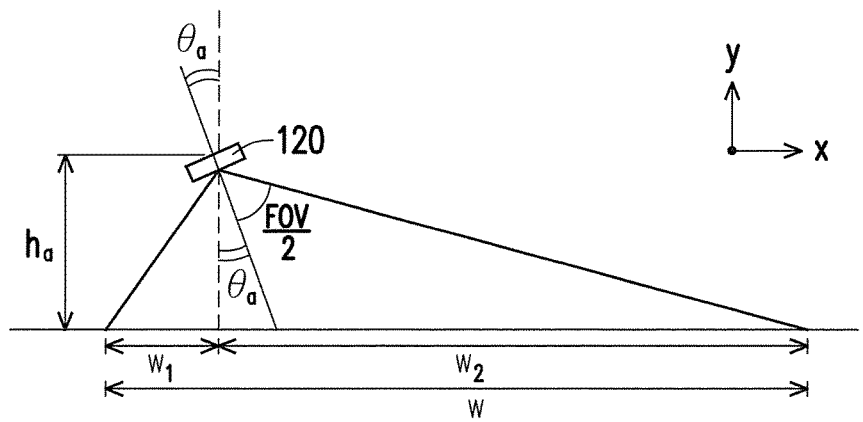
FIG. 3 is a diagram showing how to calculate a touch covering area of an optical capturing unit according to an embodiment of the invention.

It should be noted that the touch covering area is calculated and obtained based on the predetermined distance, a field of view of each of the first to fourth optical capturing units 120a-120d, and the predetermined angle. Please refer to FIG. 3. FIG. 3 is a diagram showing how to calculate the touch covering area of an optical capturing unit according to an embodiment of the invention. To be more specific, the touch covering area is calculated by the following equation:

$$w = w_1 + w_2 = h_a \cdot \left[ \tan\left(\frac{FOV}{2} - \theta_a\right) + \tan\left(\frac{FOV}{2} + \theta_a\right) \right]$$

The whole covering range of the optical capturing unit is divided into two right triangles respectively on the left and the right. $w_1$ represents the touch covering area of the right triangle on the left; $w_2$ represents the touch covering area of the right angle on the right; $h_a$ represents the predetermined distance between the optical capturing unit and the optical touch panel 200; $\theta_a$ represents the predetermined angle between the optical capturing unit and a vertical line; FOV represents the field of view of the optical capturing unit; and w represents the touch covering area of the optical capturing unit.

According to the invention, the field of view of the touch covering area of one optical capturing unit is set to be at least equal to or greater than 90 degrees, such that the fields of view of the touch covering areas of two optical capturing units cover a plane of 180 degrees.

Figure 4A:
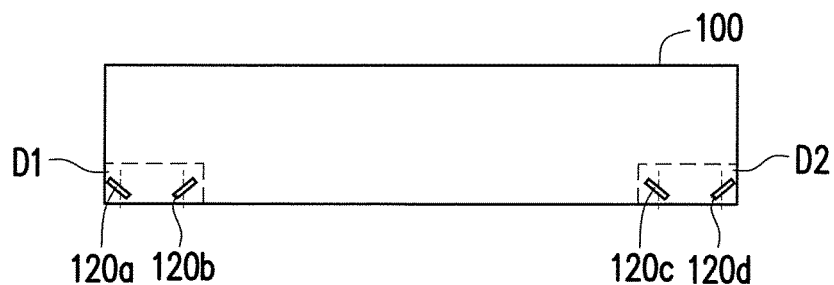
FIG. 4A and FIG. 4B are diagrams showing arrangements of the optical capturing units according to an embodiment of the invention.
Figure 4B:
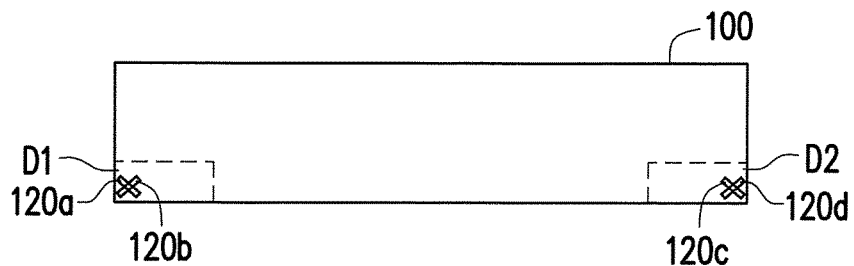

For example, FIG. 4A and FIG. 4B are diagrams showing arrangements of the optical capturing units according to an embodiment of the invention. With reference to FIG. 4A, the first and second optical capturing units 120a-120b are disposed in the first region D1. The first optical capturing unit 120a is rotated by the predetermined angle relative to the vertical line to face an outer side of the optical touch device 100 while the second optical capturing unit 120b faces an inner side of the optical touch device 100 to be symmetrical with respect to the first optical capturing unit 120a. Therefore, the fields of view of the touch covering areas of the first optical capturing unit 120a and the second optical capturing unit 120b cover a plane of at least 180 degrees. Likewise, the third and fourth optical capturing units 120c-120d are disposed in the second region D2. The third optical capturing unit 120c is rotated by the predetermined angle relative to the vertical line to face the inner side of the optical touch device 100 while the fourth optical capturing unit 120d faces the outer side of the optical touch device 100 to be symmetrical with respect to the third optical capturing unit 120c. Therefore, the fields of view of the touch covering areas of the third optical capturing unit 120c and the fourth optical capturing unit 120d also cover a plane of at least 180 degrees.

Nevertheless, in other embodiments, the first optical capturing unit 120a and the second optical capturing unit 120b may be stacked in the first region D1, and the third optical capturing unit 120c and the fourth optical capturing unit 120d may also be stacked in the second region D2, as shown in FIG. 4B. Simply put, the optical capturing units 120a-120d are arranged in the manner as shown in FIG. 4A or FIG. 4B, such that the field of view of the optical touch device 100 covers the entire plane area (i.e. the covering area of 180 degrees). However, it should be noted that the invention is not limited to the aforementioned arrangements.

Also, the touch covering area of the optical touch device 100 of the invention is at least greater than the size of the touch surface. With reference to FIG. 2 again, according to the invention, when the size of the optical touch panel 200 changes (e.g. optical touch panels 200-220), the predetermined angles respectively between the optical capturing units 120a-120d of the optical touch device 100 and the vertical line and the predetermined distances between the optical capturing units 120a-120d and the optical touch panels 200-220 are adjusted to control the touch covering area to be at least greater than the sizes of the optical touch panels 200-220, such that the touch covering area covers the optical touch panels 200-220 to detect the touch point in the touch surface.

In an embodiment, several combinations of setting values of the predetermined angles between two optical capturing units and the vertical line and the predetermined distances between the optical touch panel and the two optical capturing units are listed. The size of the optical touch panel that can be covered by the touch covering area of the two optical capturing units is calculated respectively based on these setting values, wherein $\theta_a$ and $h_a$ are the setting values of one optical capturing unit, and $\theta_b$ and $h_b$ are the setting values of the other optical capturing unit, as shown in Table 1. The last column of Table 1 shows the touch covering area that can be covered by each combination of setting values. All the combinations of the setting values of the optical capturing units are able to cover the touch covering area larger than 90 inches. Therefore, each combination of the setting values of the optical capturing units can cover the optical touch panel of at least 90 inches.

TABLE 1

| $\theta_a$ | $\theta_b$ | $h_a$ | $h_b$ | covering size (downward compatibility) |
|---|---|---|---|---|
| 30° | 30° | 110 mm | | 90" |
| 35° | 35° | 45 mm | | 90" |
| 40° | 40° | 60 mm | | 90" |
| 45° | 45° | 90 mm | | 90" |
| 50° | 50° | 180 mm | | 90" |

In brief, the invention controls the touch covering area by disposing two groups of optical capturing units (120a-120d) in the first and second regions (D1 and D2) of the optical touch device 100 and considering the fields of view of the optical capturing units (120a-120d), the predetermined angles between the optical capturing units (120a-120d) and the vertical line, and the predetermined distances between the optical capturing units (120a-120d) and the optical touch panels (200-220). Thereby, the optical touch device 100 of the invention integrates the touch covering area of each of the optical capturing units (120a-120d) to cover the optical touch panels (200-220) having various sizes, and thus is suitable for optical touch panels having different sizes and different ratios.

In the above embodiment of the invention, the control unit 110 may be a functional block implemented by hardware and/or software, wherein the hardware includes hardware equipment having a data arithmetic processing function, such as a central processing unit, a chip set, a microprocessor, or a combination of the foregoing hardware equipment. The software may be an operating system or a driver. However, it should be noted that the invention is not limited thereto. The optical capturing units 120a-120d may be camera lenses or image capturing devices. Nevertheless, the invention is not limited thereto.

In addition, the optical touch device further includes at least four light source modules and an optical touch apparatus. The at least four light source modules are respectively disposed on the first to fourth optical capturing units 120a-120d for generating light beams. The optical touch apparatus is configured to receive the light beam generated by the light source module and totally reflects the light beam along a traveling path of the light beam. The optical touch apparatus is a reflective pen, for example. A reflective layer on the core of the reflective pen includes an optical retro-reflection material. The light beam that enters the pen tip is refracted by microstructures and reflected back in the opposite direction. However, it should be noted that the invention is not limited thereto.

When the optical touch apparatus contacts the optical touch panel 200, the optical touch apparatus receives the light emitted by the light source module (e.g. infrared light, but the invention is not limited thereto) and forms the touch point on the optical touch panel 200. Next, the optical touch apparatus totally reflects the light beam along the traveling direction of the light beam such that the optical capturing units 120a-120d capture the light reflected by the optical touch apparatus at the touch point for the control unit 110 to generate a plurality of pieces of optical sensing information and convert the optical sensing information into electrical signals, so as to detect the position of the touch point.

From another aspect, the optical touch device 100 further includes an optical signal generating apparatus. The optical signal generating apparatus is configured to generate a light beam for at least two of the first to fourth optical capturing units 120a-120d to capture the optical sensing information. The optical signal generating apparatus may be an illumination or display light source system, which generates a light beam by indirect lighting or using a light emitting source, for the optical capturing units to detect the light source to generate the optical sensing information. In this embodiment, the optical signal generating apparatus may be a light emitting pen that emits the light beam through the pen tip. However, the invention is not limited thereto.

When the optical signal generating apparatus contacts the optical touch panel 200, the optical signal generating apparatus forms the touch point at the position where the optical signal generating apparatus contacts the optical touch panel 200. At the same time, the light (e.g. infrared light, but the invention is not limited thereto) emitted by the optical signal generating apparatus causes at least two of the first to fourth optical capturing units to capture the optical sensing information. Then, the control unit 110 converts a plurality of pieces of optical sensing information captured by the optical capturing units 120a-120d into electrical signals for detecting the position of the touch point.

Figure 5:
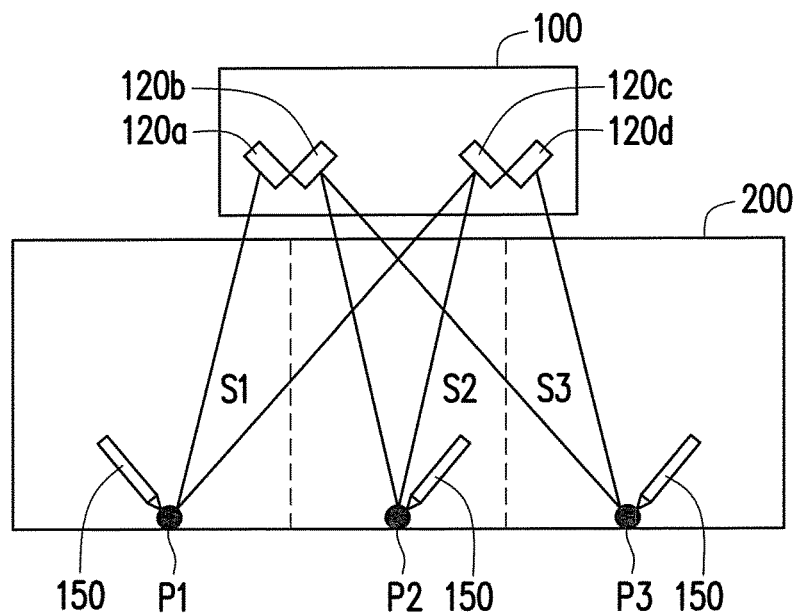
FIG. 5 is a diagram showing how the optical capturing units detect a touch point according to an embodiment of the invention.

For example, FIG. 5 is a diagram showing how the optical capturing units detect the touch point according to an embodiment of the invention. In this embodiment, touch points P1-P3 are respectively generated by using a touch pen 150 to touch the optical touch panel 200. The touch pen 150 may be the aforementioned optical touch apparatus or the optical signal generating apparatus, but the invention is not limited thereto. The optical touch device 100 converts a plurality of pieces of optical sensing information captured by the optical capturing units 120a-120d at the touch points P1-P3 into electrical signals through the control unit 110, so as to detect the positions of the touch points P1-P3.

More specifically, the control unit 110 calculates coordinates of the touch point in the optical touch panel 200 by a triangulation method, but the invention is not limited thereto. With reference to FIG. 5, the touch point P1 is in the first sub-touch area S1. This area is simultaneously detected by the first optical capturing unit 120a and the third optical capturing unit 120c. The first optical capturing unit 120a, the third optical capturing unit 120c, and the touch point P1 form a triangle. A distance between the first optical capturing unit 120a and the third optical capturing unit 120c is a fixed value. Therefore, the coordinates of the touch point P1 in the optical touch panel 200 can be calculated based on angles of the triangle respectively between the first optical capturing unit 120a and the touch point P1 and between the third optical capturing unit 120c and the touch point P1.

It should be mentioned that, in the embodiment of the invention, one touch point needs to be simultaneously detected by two optical capturing units so as to calculate the position of the touch point by the triangulation method. With reference to FIG. 5 again, the touch point P1 is in the first sub-touch area S1 that is simultaneously detected by the first optical capturing unit 120a and the third optical capturing unit 120c, the touch point P2 is in the second sub-touch area S2 that is simultaneously detected by the second optical capturing unit 120b and the third optical capturing unit 120c, and the touch point P3 is in the third sub-touch area S3 that is simultaneously detected by the second optical capturing unit 120b and the fourth optical capturing unit 120d.

Figure 6:
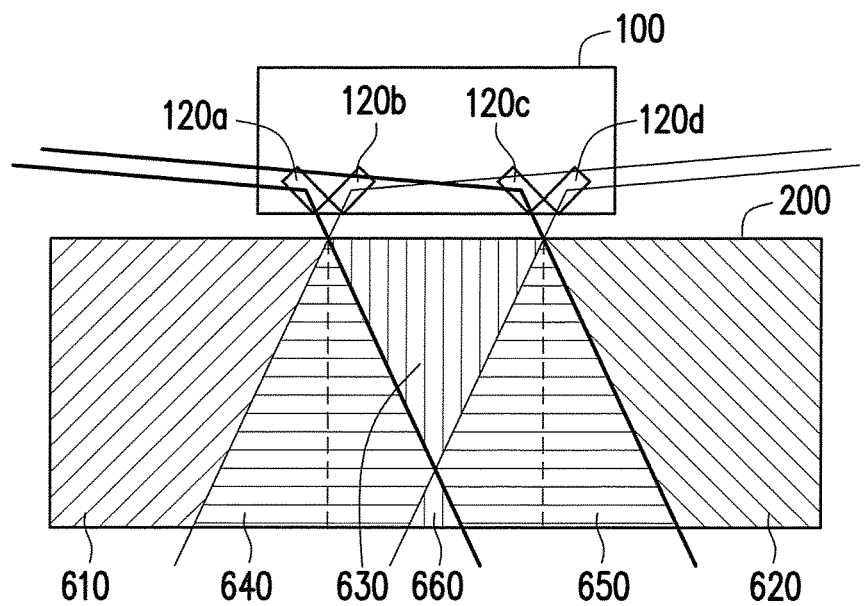
FIG. 6 is a diagram showing the number of the areas covered by a field of view of each optical capturing unit based on FIG. 5.

Thus, please refer to FIG. 6. FIG. 6 is a diagram showing the areas covered by the field of view of each optical capturing unit based on FIG. 5. The optical touch panel 200 is divided into a plurality of areas according to the first to fourth optical capturing units 120a-120d of the above embodiment of the invention. Each area corresponds to the fields of view of the optical capturing units 120a-120d. For example, the areas 610, 620, and 630 are respectively covered by the fields of view of two optical capturing units; the areas 640 and 650 are respectively covered by the fields of view of three optical capturing units; and the area 660 is covered by the fields of view of four optical capturing units. It is known from FIG. 6 that each area is at least covered by the fields of view of two lenses.

In other words, in the embodiment of the invention, the optical capturing units (120a-120d) of the optical touch device 100 are disposed in consideration of the field of view of each optical capturing unit (120a-120d), the predetermined distance between each optical capturing unit (120a-120d) and the optical touch panel 200, and the predetermined angle between each optical capturing unit (120a-120d) and the vertical line, so as to cover the whole optical touch panel 200. What is more, any position on the optical touch panel 200 needs to be covered by the fields of view of two optical capturing units. Therefore, the optical touch device of the invention covers the entire optical touch panel 200 and thereby calculates the position of the touch point accurately.

Moreover, the optical touch device 100 further includes a power supply 160. The power supply 160 is coupled to the optical touch device 100 to supply power to the optical touch device 100. The power supply 160 may be a built-in power supply or an external power supply that provides power to the optical touch device 100. The built-in power supply 160 includes one or more batteries, for example. The external power supply 160 is a general AC power supply or uses USB or Micro-USB specification as the power supply interface, for example. However, it should be noted that the invention is not limited thereto.

Figure 7:
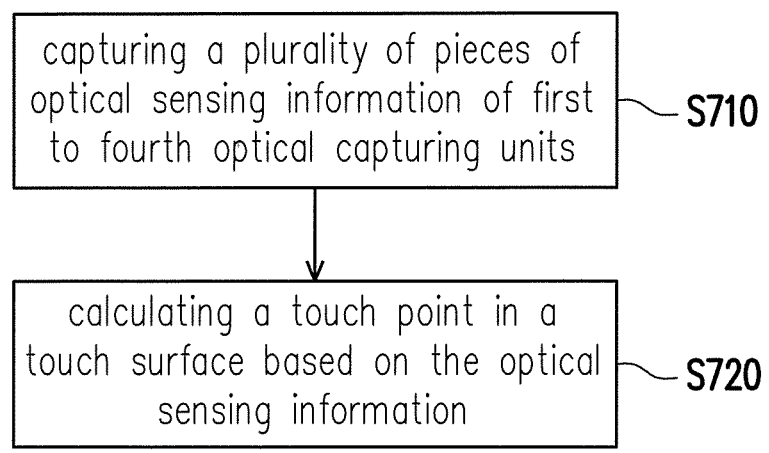
FIG. 7 is a flowchart of a touch detecting method of the optical touch device according to an embodiment of the invention.

Hereinafter, with reference to FIG. 2 and FIG. 7, FIG. 7 is a flowchart showing a touch detecting method of the optical touch device according to an embodiment of the invention. The touch detecting method of the optical touch device of this embodiment includes the following steps. First, in Step S710, a plurality of pieces of optical sensing information of first to fourth optical capturing units (e.g. the first to fourth optical capturing units 120a-120d of FIG. 2) are captured. Then, in Step S720, a touch point in a touch surface is calculated based on the optical sensing information.

To conclude the above, the optical touch device and the touch detecting method thereof disclosed in the embodiments of the invention dispose the four optical capturing units in different directions and at predetermined angles, such that the optical touch device is able to obtain the optical sensing information of each sub-touch area through two of the optical capturing units and thereby obtains the touch point. Thus, the touch surface covering a wider area is achieved without adjusting the structure of the optical touch device. Hence, the optical touch device of the invention is suitable for touch surfaces of different sizes and different ratios to meet the requirements of various touch products.

It will be apparent to those skilled in the art that various modifications and variations can be made to the disclosed embodiments without departing from the scope or spirit of the invention. In view of the foregoing, it is intended that the invention covers modifications and variations of this disclosure provided that they fall within the scope of the following claims and their equivalents.

What is claimed is:

1. An optical touch device adapted to be used with a touch surface and comprising:
    a control unit; and
    first to fourth optical capturing units coupled to the control unit and disposed on a side of the optical touch device close to the touch surface to obtain at least one piece of optical sensing information, wherein the first and second optical capturing units are disposed in a first region and the third and fourth optical capturing units are disposed in a second region, and the touch surface is divided into a first sub-touch area, a second sub-touch area, and a third sub-touch area according to positions of the first region and the second region, wherein the first and third optical capturing units face the first sub-touch area, the second and third optical capturing regions face the second sub-touch area, and the second and fourth optical capturing units face the third sub-touch area,
    wherein the control unit calculates at least one touch point in the touch surface based on a plurality of pieces of optical sensing information captured by the first to fourth optical capturing units, each of the first to fourth optical capturing units is respectively disposed at a predetermined distance from the touch surface and arranged at a predetermined angle,
    wherein a field of view of the first and second optical capturing units covers at least 180 degrees, and a field of view of the third and fourth optical capturing units covers at least 180 degrees,
    wherein a touch covering area of each of the first to fourth optical capturing units is obtained based on the following equation:

$$w = h_a \cdot \left[ \tan\left(\frac{FOV}{2} - \theta_a\right) + \tan\left(\frac{FOV}{2} + \theta_a\right) \right],$$

wherein $h_a$ the predetermined distance, $\theta_a$ is the predetermined angle, FOV is the field of view, and w is positively correlated to the touch covering area,
    wherein each touch point in the touch surface is simultaneously detected by at least one of the first and second optical capturing units, and at least one of the third and fourth optical capturing units.

2. The optical touch device according to claim 1, wherein the field of view of each of the first to fourth optical capturing units the touch covering area is greater than or equal to 90 degrees.

3. The optical touch device according to claim 1, wherein the touch covering area is at least greater than a size of the touch surface.

4. The optical touch device according to claim 1, further comprising:
    at least four light source modules respectively disposed on the first to fourth optical capturing units to generate a light beam; and
    an optical touch apparatus receiving the light beam and totally reflecting the light beam along a traveling path of the light beam.

5. The optical touch device according to claim 1, further comprising:
    an optical signal generating apparatus generating a light beam for at least two of the first to fourth optical capturing units to capture the optical sensing information.

6. The optical touch device according to claim 1, further comprising:
    a power supply coupled to the optical touch device to provide power to the optical touch device.

7. A touch detecting method for an optical touch device used with a touch surface, the touch detecting method comprising:
    capturing a plurality of pieces of optical sensing information of first to fourth optical capturing units, wherein the first and second optical capturing units are disposed in a first region and the third and fourth optical capturing units are disposed in a second region, and the touch surface is divided into a first sub-touch area, a second sub-touch area, and a third sub-touch area according to positions of the first region and the second region, wherein the first and third optical capturing units face the first sub-touch area, the second and third optical capturing units face the second sub-touch area, and the second and fourth optical capturing units face the third sub-touch area, wherein each of the first to fourth optical capturing units is respectively disposed at a predetermined distance from the touch surface and arranged at a predetermined angle, a field of view of the first and second optical capturing units covers at least 180 degrees, and a field of view of the third and fourth optical capturing units covers at least 180 degrees, and a touch covering area of each of the first to fourth optical capturing units is obtained based on the following equation:

$$w = h_a \cdot \left[ \tan\left(\frac{FOV}{2} - \theta_a\right) + \tan\left(\frac{FOV}{2} + \theta_a\right) \right],$$

wherein $h_a$ is the predetermined distance, $\theta_a$ is the predetermined angle, FOV is the field of view, and W is positively correlated to the touch covering area; and calculating a touch point in the touch surface based on the optical sensing information, wherein the touch point in the touch surface is simultaneously detected by at least one of the first and second optical capturing units, and at least one of the third and fourth optical capturing units.

* * * * *